(12) United States Patent
Kolam et al.

(10) Patent No.: US 9,697,188 B2
(45) Date of Patent: Jul. 4, 2017

(54) METHOD TO ENABLE CROSS-ORIGIN RESOURCE SHARING FROM A WEBPAGE INSIDE A PRIVATE NETWORK

(71) Applicant: Instart Logic, Inc., Mountain View, CA (US)

(72) Inventors: Hariharan Kolam, Sunnyvale, CA (US); Brian Kennedy, Mountain View, CA (US)

(73) Assignee: Instart Logic, Inc., Palo Alto, CA (US)

( * ) Notice: Subject to any disclaimer, the term of this patent is extended or adjusted under 35 U.S.C. 154(b) by 367 days.

(21) Appl. No.: 14/081,905

(22) Filed: Nov. 15, 2013

(65) Prior Publication Data

US 2015/0143223 A1    May 21, 2015

(51) Int. Cl.
| | | |
|---|---|---|
| G06F 17/00 | (2006.01) | |
| G06F 17/22 | (2006.01) | |
| H04L 29/08 | (2006.01) | |
| H04L 29/06 | (2006.01) | |
| G06F 21/53 | (2013.01) | |
| G06F 9/54 | (2006.01) | |
| G06F 17/30 | (2006.01) | |

(52) U.S. Cl.
CPC ............ *G06F 17/2247* (2013.01); *G06F 9/54* (2013.01); *G06F 17/3089* (2013.01); *G06F 21/53* (2013.01); *H04L 29/06619* (2013.01); *H04L 29/08072* (2013.01); *H04L 67/02* (2013.01); *H04L 67/2814* (2013.01)

(58) Field of Classification Search
CPC .. G06F 17/24; G06F 17/2247; G06F 17/3089; G06F 9/54; G06F 21/53; H04L 29/08072; H04L 29/06619; H04L 67/02; H04L 67/2814
See application file for complete search history.

(56) References Cited

U.S. PATENT DOCUMENTS

2007/0192246 A1\*    8/2007    Futamase ............. G06Q 20/102
                                                                        705/40
2007/0299857 A1    12/2007    Gwozdz et al.
(Continued)

FOREIGN PATENT DOCUMENTS

| FR | 2967856 | 5/2012 |
|---|---|---|
| WO | 2008039971 | 4/2008 |
| WO | 2009018375 | 2/2009 |

OTHER PUBLICATIONS

Nicholas C. Zakas, "Cross-domain Ajax with Cross-Origin Resource Sharing", May 25, 2010, NCZOnline, pp. 6.\*

(Continued)

*Primary Examiner* — Chau Nguyen
(74) *Attorney, Agent, or Firm* — Van Pelt, Yi & James LLP

(57) ABSTRACT

A method of delivering content of a webpage to a web browser on a device communicating with a network through a proxy server includes embedding a first nested browsing context in a parent browsing context of the web browser where the parent browsing context is associated with a first domain and the first nested browsing context is associated with a second domain; sending a request for content from the first nested browsing context to the second domain through the proxy server; and receiving at the first nested browsing context the content from the second domain.

14 Claims, 10 Drawing Sheets

(56) References Cited

U.S. PATENT DOCUMENTS

| | | | | |
|---|---|---|---|---|
| 2009/0265760 A1* | 10/2009 | Zhu | ............... | G06F 21/53 726/3 |
| 2009/0328063 A1* | 12/2009 | Corvera | ............ | G06F 9/54 719/315 |
| 2010/0049792 A1* | 2/2010 | Hao | ............... | H04L 67/02 709/203 |
| 2010/0281107 A1* | 11/2010 | Fallows | ............ | G06F 9/54 709/203 |
| 2013/0014243 A1* | 1/2013 | Chen | ............ | H04L 67/2804 726/8 |
| 2014/0006548 A1* | 1/2014 | Tsolis | ............ | G06F 17/30861 709/217 |
| 2014/0082140 A1* | 3/2014 | Toussaint | ............ | H04L 67/2814 709/217 |
| 2014/0195645 A1* | 7/2014 | Cohen | ............ | H04L 67/32 709/219 |

OTHER PUBLICATIONS

Michael Herzog, "Solving "Same Origin Policy" Issue in different ways", Jun. 29, 2013, SAPUI5 Developer Center, SAP Community Network, pp. 6.*

Nicholas C. Zakas, "Cross-domain Ajax with Cross-Origin Resource Sharing", May 25, 2010, published by NCZOnline, pp. 6.*

Collin Jackson and Helen J. Wang, "Subspace: Secure Cross-Domain Communication for Web Mashups", WWW 2007 / Track: Security, Privacy, Reliability, and Ethics, pp. 9.*

Yufei et al., "Credibility based cross- security domain", Published-No. CN103338194A, Oct. 2, 2013, pp. 2.*

* cited by examiner

```
<html>
  <head>
    <title>Welcome</title>
  </head>
  <body>
    <h1>HelloWorld </h1>
        .
        .
        .
    <img src = "url for image"/>
    <video>
       <source src = "url for video" type = "video/ogg"  />
    </video>
    <script type = "text/javascript">
    <!--script
    *** Some javascript code is placed here ***
    -->
    </script>

<script src = "myScript.js">
    </script>

</body>
</html>
```

— Text (from `<h1>HelloWorld </h1>`)
— Image (from `<img>`)
— Video (from `<source>`)
— Inline JavaScript
— External JavaScript

FIG. 2

METHOD TO ENABLE CROSS-ORIGIN RESOURCE SHARING FROM A WEBPAGE INSIDE A PRIVATE NETWORK

BACKGROUND OF THE INVENTION

Typically, a web server needs to generate a webpage by integrating static and dynamic content. The wait time experienced by an end-user of a browsing session may vary from a few hundred milliseconds to a few seconds. Therefore, improved techniques for delivering information corresponding to a webpage would be desirable.

Furthermore, a web browser typically needs to receive dependent resources associated with different links and URLs before it can complete the rendering of a webpage. The startup wait time experienced by an end-user of a browsing session may be insignificant in low-latency networks, such as wired Ethernet networks, but unacceptably long for an end-user in higher-latency networks, such as cellular 3G networks or wireless networks. Therefore, improved techniques for delivering information corresponding to a webpage would be desirable.

BRIEF DESCRIPTION OF THE DRAWINGS

Various embodiments of the invention are disclosed in the following detailed description and the accompanying drawings.

FIG. 2 is a diagram illustrating an embodiment of an HTTP response 200 returning an HTML file.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a web browser uses an embedded nested browsing context to access a cross-origin domain, that is a domain different from the domain associated with the web browser. The nested browsing context is associated with the cross-origin domain and sends same-origin requests to the cross-origin domain. In some embodiments, the embedded nested browsing context is an inline frame (iframe) of the web browser. In this manner, the use of cross-origin resource sharing (CORS) requests is avoided and the web browser may access resources on multiple domains, even when the web browser may be behind a firewall of a private network.

Figure 1:
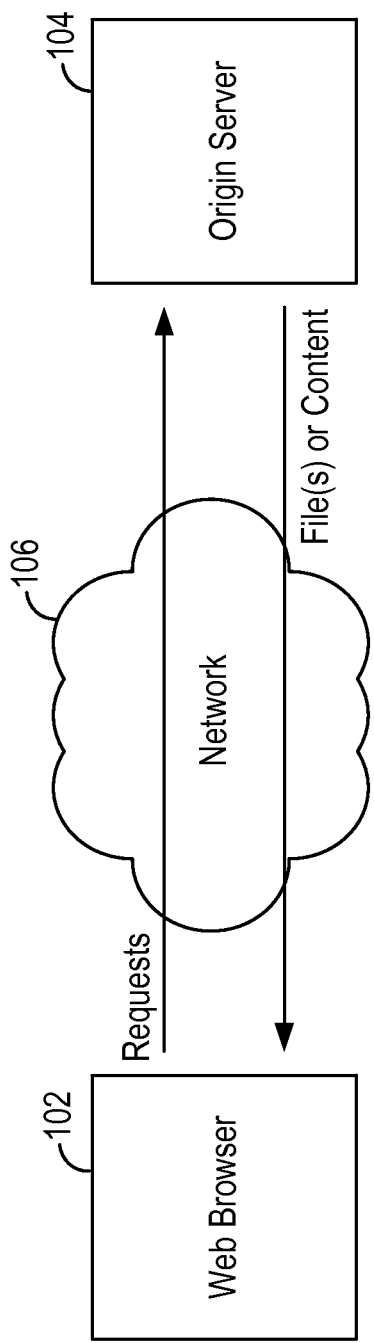
FIG. 1 is a block diagram illustrating an embodiment of a web browser accessing webpages and other information through a network.

FIG. 1 is a block diagram illustrating an embodiment of a web browser accessing webpages and other information through a network. As shown in FIG. 1, a web browser 102 sends a request for a webpage to an origin server 104 (e.g., a web publisher, such as www.yahoo.com and www.cnn.com), and web browser 102 receives the content corresponding to the webpage through a network 106. Network 106 may be any combination of public or private networks, including intranets, local area networks (LANs), wide area networks (WANs), radio access networks (RANs), Wi-Fi networks, the Internet, and the like. Web browser 102 may run on different types of devices, including laptop computers, desktop computers, tablet computers, smartphones, and other mobile devices.

A webpage accessed by web browser 102 may be described by different markup languages, including Hypertext Markup Language (HTML), Extensible Markup Language (XML), and the like. The webpage may also be described by different scripting languages, including JavaScript Object Notation (JSON), and the like. The webpage may be described by other custom languages as well. HTML is used hereinafter as an example of the various languages for describing webpages. Note that the examples of HTML are selected for illustrative purposes only; accordingly, the present application is not limited to these specific examples.

FIG. 2 is a diagram illustrating an embodiment of an HTTP response 200 returning an HTML file. To display the webpage, web browser 102 sends a Hypertext Transfer Protocol (HTTP) request message to origin server 104 requesting the HTML webpage file. After origin server 104 locates the requested HTML webpage file, origin server 104 returns the requested HTML webpage file in an HTTP response message to web browser 102. Web browser 102 then parses the received webpage and begins to process and render the webpage.

As shown in FIG. 2, the HTML file may include text, dependent resources, scripts, and the like. Examples of dependent resources include images, videos, audio clips, and APIs (application programming interfaces). These dependent resources are resources that need to be separately transferred from origin server 104 or from other servers to web browser 102. For example, as shown in FIG. 2, the list of dependent resources includes an image, which is stored at a location specified by an URL. To display the image on the webpage, web browser 102 sends a separate HTTP request message to the URL, and the image is returned in a separate HTTP response message from the URL.

The HTML file in FIG. 2 may include one or more scripts for making the webpage dynamic and interactive. For example, scripts may be used to manipulate the webpage's content and behavior or to respond to end-user actions. As shown in FIG. 2, the <script> tags (i.e., <script> and </script> tags) are used to define a client-side script, such as a JavaScript. A JavaScript may be either inline or external. For inline JavaScripts, the JavaScript code is directly embedded and integrated into the HTML code in FIG. 2. JavaScript code may also be placed in external files. For example, external JavaScript files have the file extension .js. An external JavaScript file may be inserted into the HTML file by specifying a URL for the .js file in the "src" attribute of the <script> tag. The external JavaScript is another type of dependent resource, and is downloaded from the URL and then executed.

Figure 3:
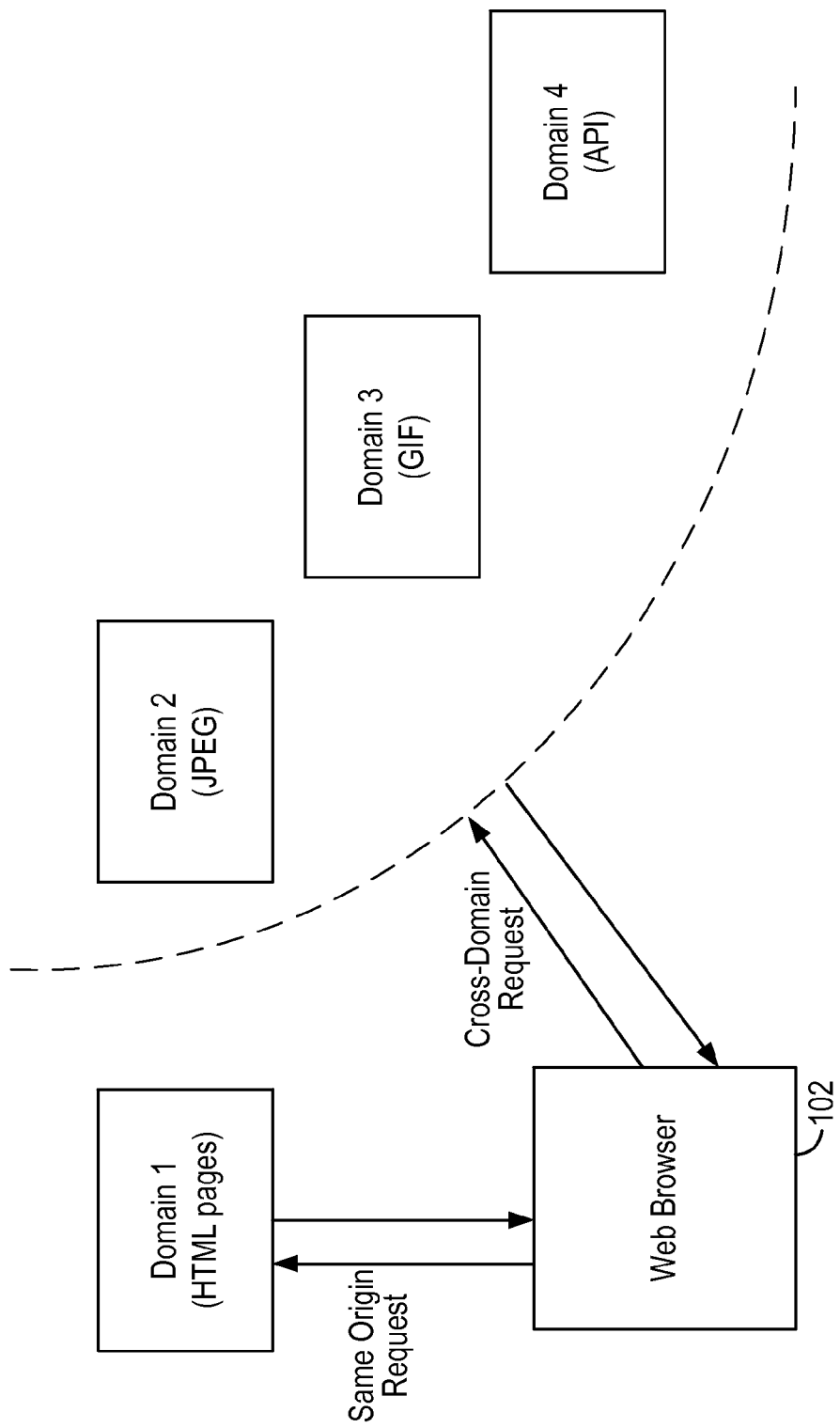
FIG. 3 is a block diagram illustrating that the referenced dependent resources and the webpages of a website may be hosted on multiple domains.

FIG. 3 is a block diagram illustrating that the referenced dependent resources and the webpages of a website may be hosted on multiple domains. As shown in FIG. 3, in a particular website, the HTML webpages of the website may be downloaded directly from the origin server 104 in domain 1, a portion of the JPEG images may be hosted by domain 2, the GIF images may be hosted by domain 3, and the APIs may be hosted by domain 4. Multiple domains are used to serve different dependent resources for different reasons. For example, web browser 102 may open multiple concurrent connections and download more dependent resources in parallel if the dependent resources are hosted on different domains. Furthermore, medium to large websites often move their static content (e.g., image and JavaScript files) to a CDN (content distribution network), because deploying this content across multiple geographically dispersed servers can reduce the download time of this content. As the CDN and origin server 104 have different domain names, the referenced dependent resources and the webpages are hosted on multiple domains.

The various domains associated with the referenced dependent resources of a webpage can be determined by parsing the webpage. For example, with reference to FIG. 2, the image file and the video file are indicated on the webpage as being stored in different locations, each specified by a URL. As each URL includes its domain information, the domains of the image and video files can be determined by parsing their respective URLs.

A web browser security restriction known as the same-origin security policy prevents a web browser from accessing resources on a domain that is not the origin domain of the website. That is, any request from a website has to go to the same origin domain of the website and "cross-domain" requests, referring to a website accessing resources on a domain different from the website's origin domain, is normally denied under the same-origin security policy. However, cross-domain requests (also "cross-origin requests") can be established through the use of Cross-Origin Resource Sharing (CORS). CORS is a mechanism that allows one website to access another website's resources despite being under different domain names. CORS is an HTML5 feature and defines a way in which a web browser and the website server can interact to determine whether or not to allow the cross-origin request. In the example shown in FIG. 3, web browser 102 makes same-origin request to domain 1 for resources but web browser 102 must make cross-domain requests to domain 2, domain 3 and domain 4 for resources.

Figure 4:
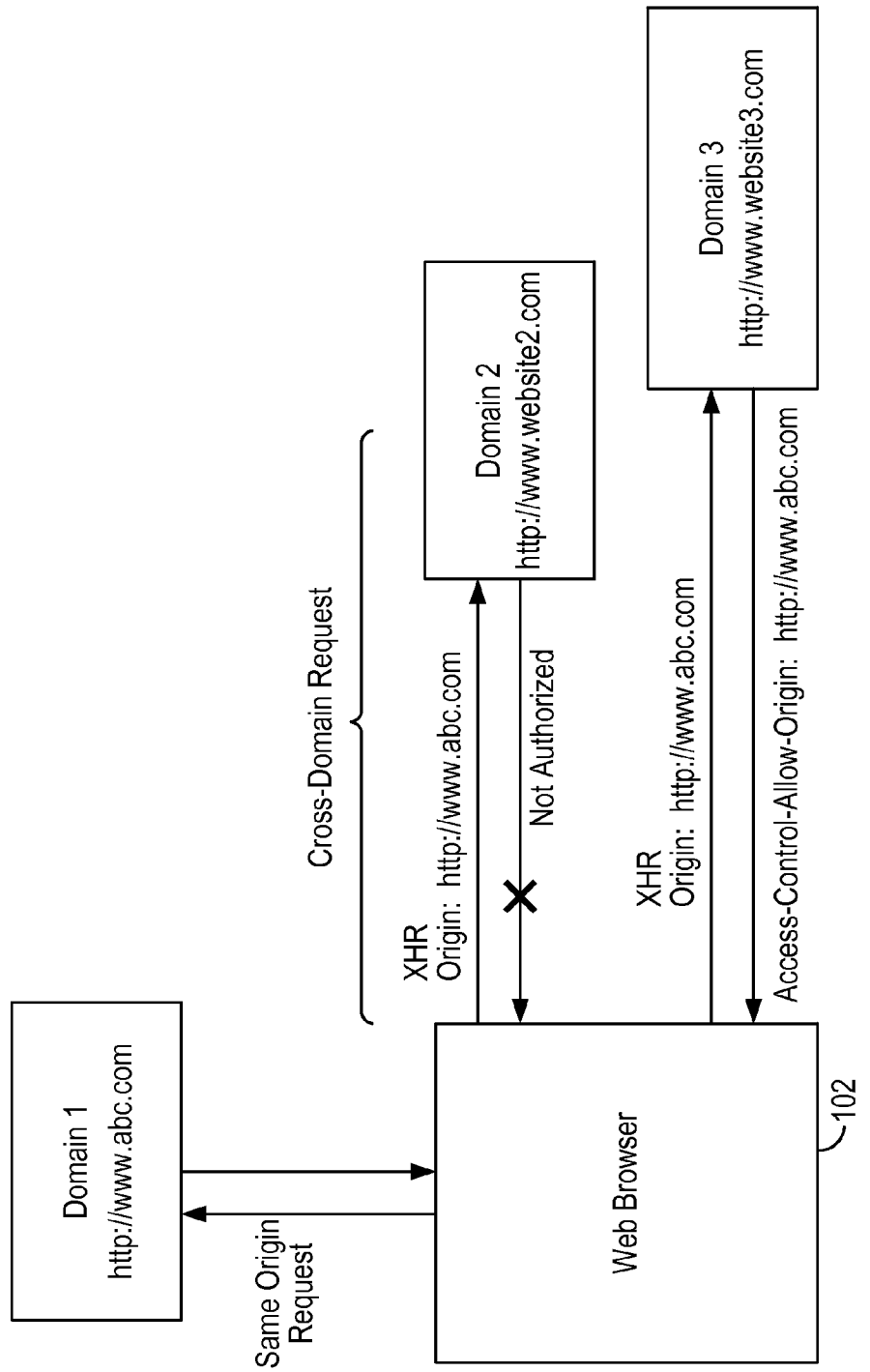
FIG. 4 illustrates the use of same-origin requests and cross-origin requests to access resources from multiple domains.

FIG. 4 illustrates the use of same-origin requests and cross-origin requests to access resources from multiple domains. In the example shown in FIG. 4, web browser 102 makes GET requests to different domains to access resources on those domains. In the present description, "requests" made by the web browser to access resources refer to the "GET requests" for resources. Other requests, such as the PUT or POST request, or other state-affecting requests, are handled using different protocols and are not within the scope of the present description. For instance, for PUT or POST requests, the web browser will negotiate with the server before sending the request.

In the example shown in FIG. 4, web browser 102 may make same-origin GET requests to domain 1 for resources but web browser 102 will need to make cross-domain GET requests to domains 2 and 3 to obtain resources from these domains. For instance, the website www.abc.com (origin domain) may attempt to access resources on the website www.website2.com or website www.website3.com (cross domain). In the present example, the cross-domain GET requests are CORS requests. The CORS standard operates by adding new HTTP headers that allow servers to serve resources to permitted origin domains.

In one example, a CORS request is established as follows. The web browser 102, having domain 1 (www.abc.com) as the origin domain, sends a request to domain 2 (www.website2.com) with an Origin HTTP header to solicit cross-domain access. The request may be an XHR (XMLHttpRequest). Domain 2 validates the origin domain (www.abc.com) in the CORS request. If domain 2 does not allow the cross-domain request, that is, domain 1 (www.abc.com) is not a permitted origin domain on domain 2, the web browser 102 will receive an error message indicating the CORS request is not authorized.

In another example, the web browser 102, having domain 1 (www.abc.com) as the origin domain, sends a request to domain 3 (www.website3.com) with an Origin HTTP header to solicit cross-domain access. The request may be an XHR (XMLHttpRequest). Domain 3 validates the origin domain in the CORS request. If domain 1 is a permitted origin domain, then domain 3 returns a response with a CORS authorization header. In particular, domain 3 returns a response with an "access-control-allow-origin" header with the origin domain (www.abc.com) (or a wildcard "*") to the web browser 102. With the CORS authorization header, domain 1 can now make CORS requests for resources from domain 3.

Figure 5:
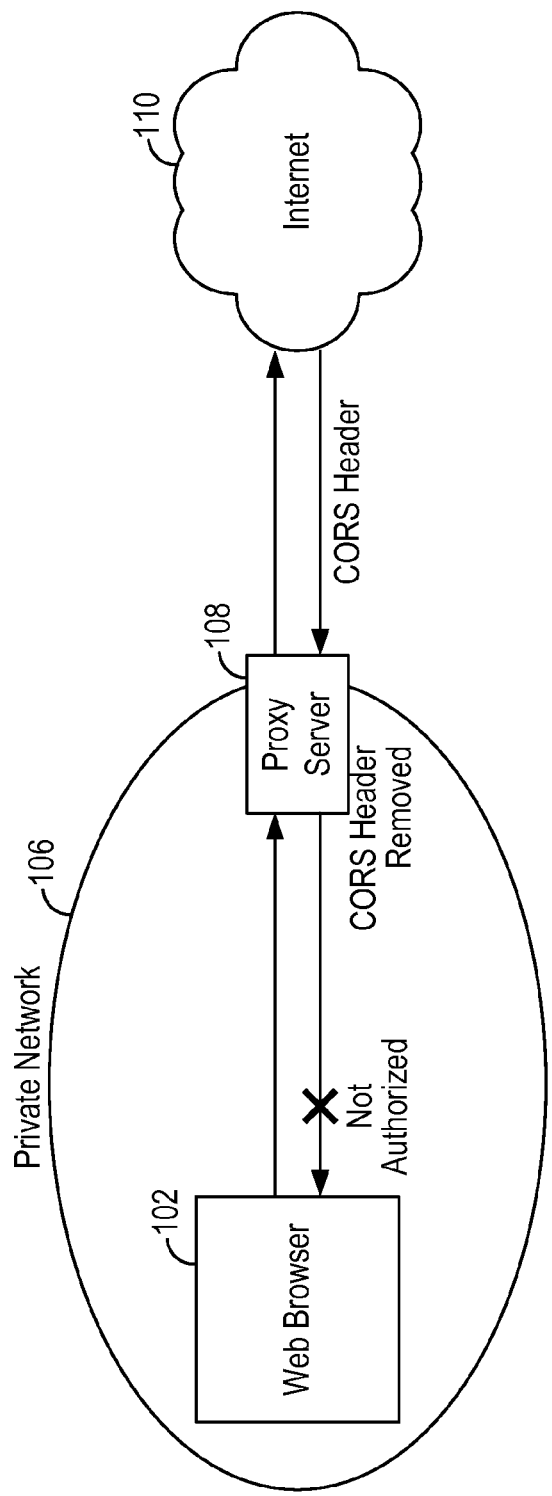
FIG. 5 illustrates an example of a web browser making CORS requests from a private network.

However, there are certain network configurations where the use of CORS requests may be problematic. For example, web browser 102 may be situated inside a private network and sits behind a firewall of the private network. FIG. 5 illustrates an example of a web browser making CORS requests from a private network. Web browser 102, being disposed inside a private network 106, may communicate with other domains on the Internet 110 through a proxy server 108 of the private network. When the web browser 102 makes a CORS request to a requested domain, the CORS request is communicated to proxy server 108 and further onto the requested domain on the Internet 110. When the requested domain validates the origin domain of the web browser 102, the requested domain returns a response with the CORS authorization header. The response with the CORS authorization header is communicated to the proxy server 108 before reaching the web browser 102. In some cases, the proxy server 108, which may include a firewall, may strip or remove the CORS authorization header from the response. In that case, by the time the response reaches the web browser 102, the response no longer has the necessary CORS authorization header and the web browser 102 believes it is denied access to the resources on the requested domain.

Figure 6:
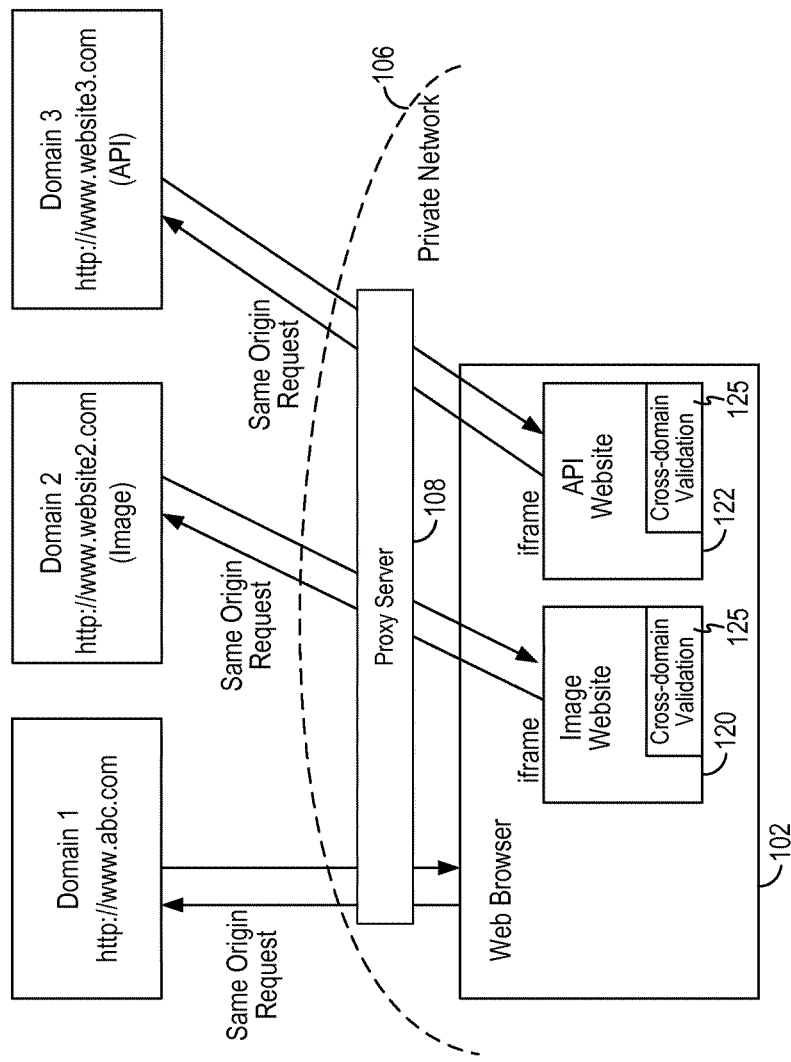
FIG. 6 illustrates an example web browser accessing cross-domain resources using the content delivery method in embodiments of the present invention.

In embodiments of the present invention, a method of delivering content of a webpage to a web browser on a device communicating with a network through a proxy server uses a nested browsing context within a parent browsing context of the web browser. FIG. 6 illustrates an example web browser accessing cross-domain resources using the content delivery method in embodiments of the present invention. In the example shown in FIG. 6, the web browser 102 is situated inside a private network 106 and communicates with a data network, such as the Internet, through a proxy server 108 at the edge of the private network. The web browser 102 has a parent browsing context being associated with the origin domain. In the present example, the parent browsing context is associated with domain 1 and having www.abc.com as the origin domain.

To enable cross-domain access, web browser has embedded therein one or more nested browsing context in the parent browsing context of the web browser. Each of the embedded nested browsing contexts is associated with a domain that is different from the origin domain. In the present example, a first nested browsing context 120 is associated with domain 2 which is an image website, such as www.website2.com and a second nested browsing context 122 is associated with domain 3 which is an API website, such as www.website3.com. To access resources on domain 2 and domain 3, the nested browsing contexts 120, 122 make GET requests to the respective domains through the proxy server 108. The GET requests made by the nested browsing contexts 120, 122 are same-origin requests as the nested browsing context is associated with the same domain from which it is requesting resources. The same-origin requests and responses can propagate through the proxy server 108 and the nested browsing contexts 120, 122 receive the requested resources from the respective domains. The nested browsing contexts 120, 122 communicate with the parent browsing context of the web browser 102 through messaging to provide the requested resources. In this manner, the use of cross-origin resource sharing (CORS) requests is avoided and the web browser 102 may access resources on multiple domains, even when the web browser may be behind a firewall of a private network.

In embodiments of the present invention, the nested browsing context performs local cross-domain validation. When cross-domain requests are made using the conventional CORS mechanism, the requested domain performs the validation to ensure that the requesting origin domain is a permitted website. When the content delivery method of the present invention is employed, the nested browsing context uses same-origin requests to obtain resources from the cross-domain website and thus no CORS security validation is performed at the cross-domain website. In order to ensure security, validation of the cross-domain access is performed locally at the nested browsing context in embodiments of the present invention. In one embodiment, a client 125 of the web browser 102 performs cross-domain validation to verify that the origin domain of the parent browsing context is allowed to make the request for resources from the cross-domains. For example, the cross-domain validation is performed to ensure that domain 1 (www.abc.com) is permitted to access domain 2 (www.website2.com) or domain 3 (www.website3.com).

Figure 7:
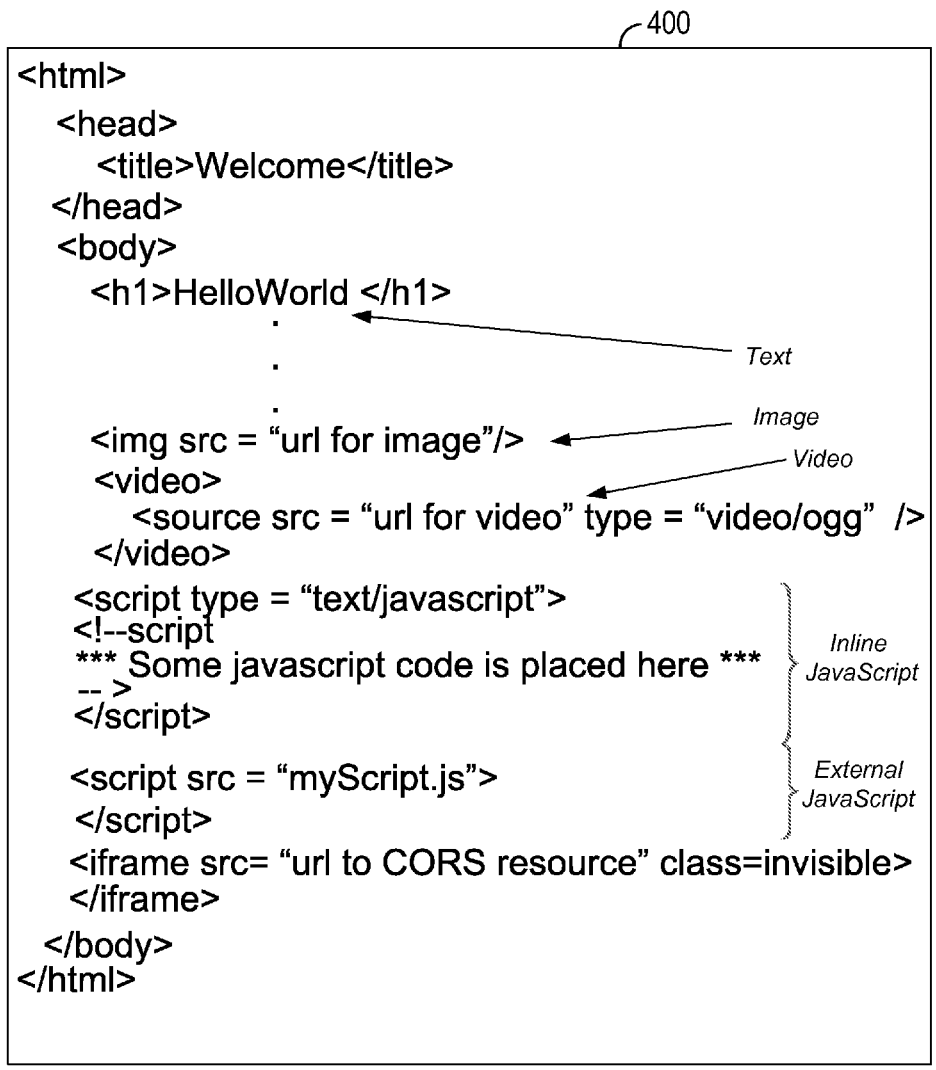
FIG. 7 is a diagram illustrating an embodiment of an HTTP webpage 400 containing the <iframe> element.

In some embodiments, the embedded nested browsing context is an inline frame (iframe) of the web browser. FIG. 7 is a diagram illustrating an embodiment of an HTTP webpage 400 containing the <iframe> element. In an HTML web page, the <iframe> tag specifies an inline frame which is used to embed another document within the current HTML document. In embodiments of the present invention, the <iframe> element is used to direct the iframe to request resources from a cross-domain, as specified by the URL of the CORS resource. In some embodiments, attributes of the iframe may be set in such a way that some of the functions or features are disabled; for example, an attribute may be set to turn off visibility. For example, in the webpage 400, the visibility attribute can be turned off by specifying "class=invisible". Accordingly, the web browser is instructed to make the iframe invisible, that is, the contents of the iframe should not be rendered. The "class=invisible" is optional and is illustrative only. When the iframe retrieves the resources at the URL of the cross-domain, the iframe loads the resources into the local cache and communicates with the parent browsing context through messaging. The parent browsing context may then fetch the resource from the local cache and render the content.

Figure 8:
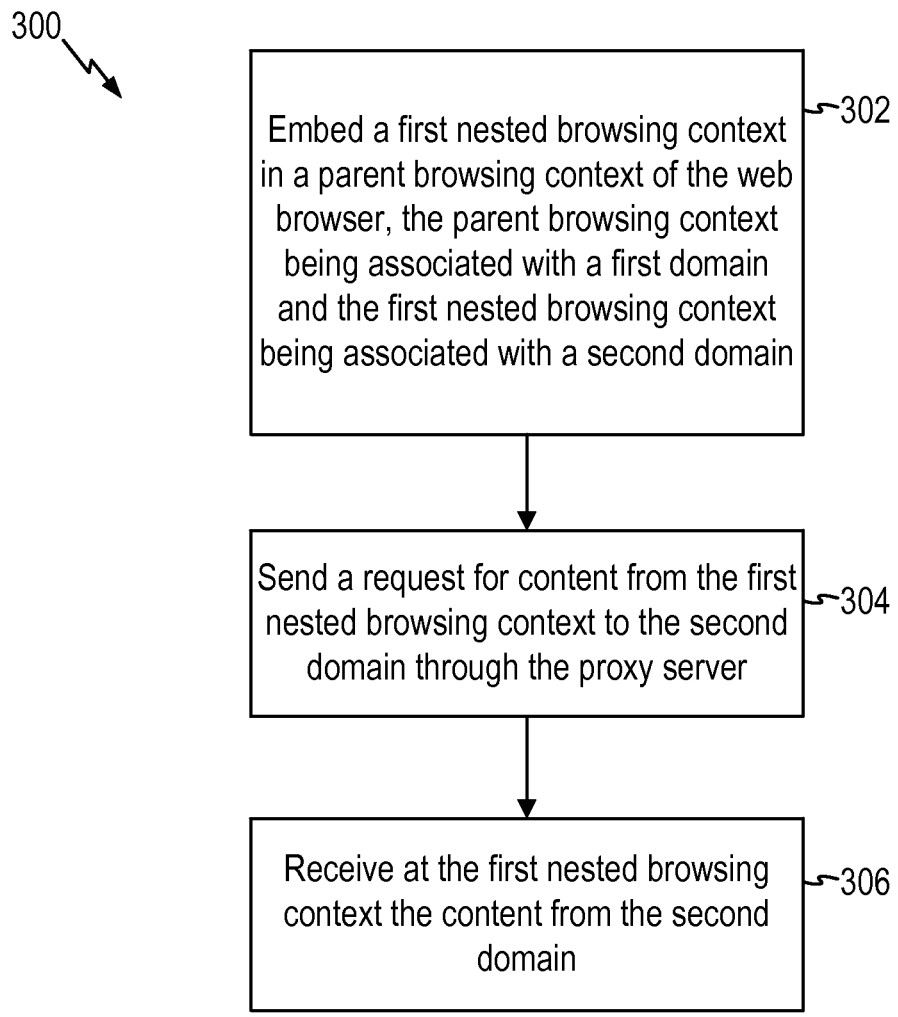
FIG. 8 is a flow chart illustrating the content delivery method in one embodiments of the present invention.

FIG. 8 is a flow chart illustrating the content delivery method in one embodiments of the present invention. Referring to FIG. 8, a content delivery method 300 starts by embedding a first nested browsing context in a parent browsing context of the web browser. The parent browsing context is associated with a first domain while the first nested browsing context is associated with a second domain (302). Then, at 304, the method 300 sends a request for content from the first nested browsing context to the second domain through the proxy server. The request can be a GET request in one example. At 306, the method 300 receives at the first nested browsing context the content from the second domain.

Figure 9:
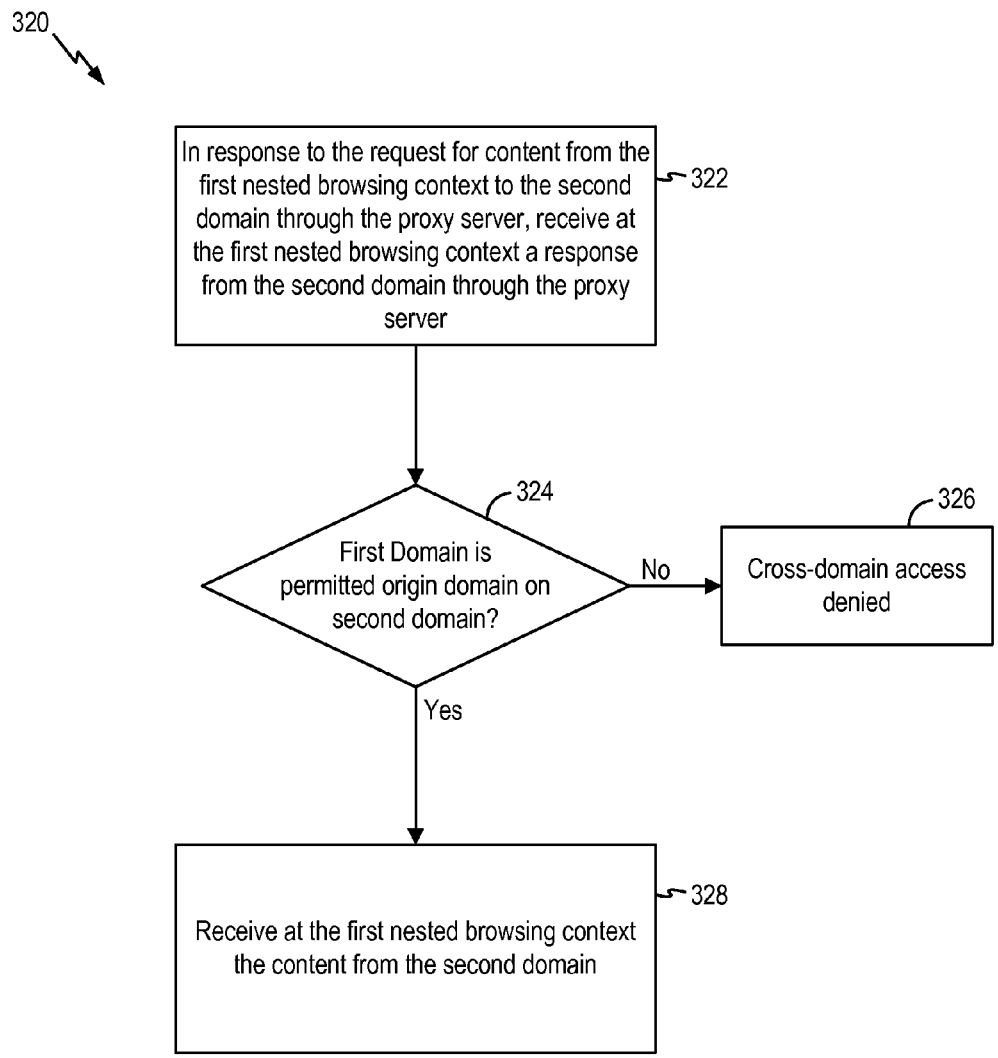
FIG. 9 is a flow chart illustrating the cross-domain validation method that can be incorporated in the content delivery method in an alternate embodiment of the present invention.

In embodiments of the present invention, the content delivery method further performs cross-domain validation to ensure security of the cross-domain access. FIG. 9 is a flow chart illustrating the cross-domain validation method that can be incorporated in the content delivery method in an alternate embodiment of the present invention. Referring to FIG. 9, cross-domain validation method 320 starts by receiving at the first nested browsing context a response from the second domain through the proxy server (322). The response was sent from the second domain in response to a request for content from the first nested browsing context to the second domain through the proxy server. Then, at 324, the method 320 determines whether the first domain of the parent browsing context is a permitted origin domain on the second domain. In the case that the first domain of the parent browsing context is not a permitted origin domain on the second domain, the cross-domain access is denied (326). In the case that the first domain of the parent browsing context is a permitted origin domain on the second domain, the method 320 then receives at the first nested browsing context the requested content from the second domain (328).

In embodiments of the present invention, the content delivery method is further configured to perform detection of CORS request capability. The method determines if CORS requests can be made from the web browser before implementing the nested browsing context. In this manner, when the web browser is not restricted by intervening firewalls and is able to rely on CORS mechanism to obtain resources from cross-origin domains, then the web browser may proceed with using the conventional CORS mechanism. However, when the method detects that a CORS request fails to execute, the method will implement the nested browsing context to enable access to the cross-domain resources.

Figure 10:
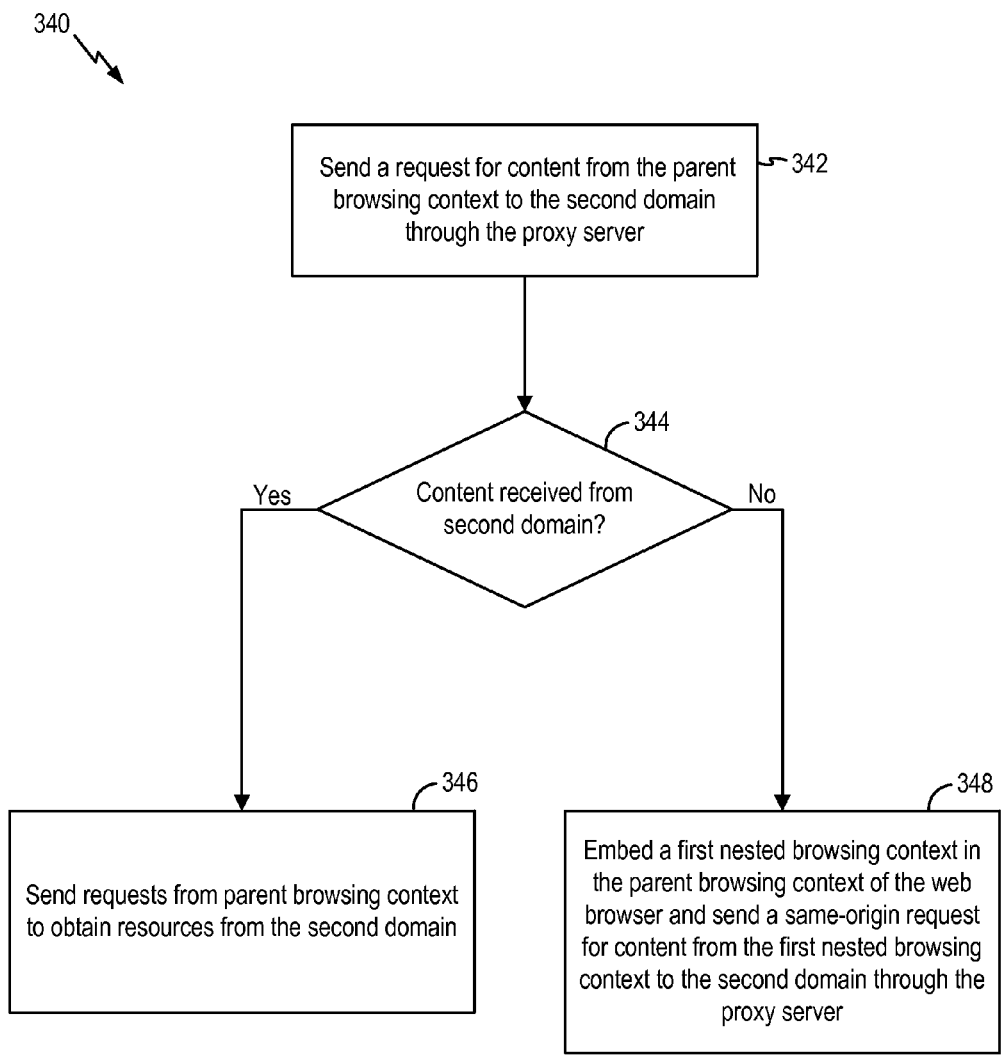
FIG. 10 is a flow chart illustrating the detection method that can be incorporated in the content delivery method in an alternate embodiment of the present invention.

FIG. 10 is a flow chart illustrating the detection method that can be incorporated in the content delivery method in an alternate embodiment of the present invention. Referring to FIG. 10, the detection method 340 starts by sending a request for content from the parent browsing context to the second domain through the proxy server (342). In one embodiment, the request is made for a very small resource as the request is made for detection purpose only. In one embodiment, the request is a CORS request.

Then at 344, the method 340 determines whether the parent browsing context received the requested content from the second domain. In this manner, the method determines whether the parent browsing context is able to obtain cross-domain resources through the proxy server. In one embodiment, when a CORS request was made, the method determines whether the CORS authorization header is present in the response received. If the requested content is received from the second domain or if the CORS authorization header is present, then method 340 proceeds to send requests from parent browsing context to obtain resources from the second domain (346). If the requested content is not received or if the CORS authorization header is not present, then method 340 employs the content delivery method described above by embedding a first nested browsing context in the parent browsing context of the web browser and sending a same-origin request for content from the first nested browsing context to the second domain through the proxy server (348).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of delivering content of a webpage to a web browser on a device communicating with a network through a proxy server, comprising:
   providing on the web browser a parent browsing context associated with a first domain, the web browser communicating with the network through the proxy server;
   sending a cross-origin resource sharing (CORS) request for content from the parent browsing context to a second domain through the proxy server to request content from the second domain;
   in response to the parent browsing context failing to receive the content from the CORS request, embedding a first nested browsing context in the parent browsing context of the web browser, the first nested browsing context being associated with the second domain;
   sending a same-origin request for content from the first nested browsing context to the second domain through the proxy server, wherein the content requested from the same-origin request is the same as the content requested from the CORS request; and
   receiving at the first nested browsing context the content from the second domain.

2. The method of claim 1, wherein embedding a first nested browsing context in a parent browsing context of the web browser comprises:
   embedding an inline frame as the first nested browsing context in the parent browsing context of the web browser, the parent browsing context being associated with the first domain and the inline frame being associated with the second domain.

3. The method of claim 1, further comprising:
   receiving at the parent browsing context a response from the second domain through the proxy server;
   determining that the response does not include an access-control-allow-origin header in response to the CORS request; and
   embedding, based at least in part on the determining, the first nested browsing context in the parent browsing context of the web browser and sending the same-origin request for content from the first nested browsing context to the second domain through the proxy server.

4. The method of claim 3, further comprising:
   determining that the response includes an access-control-allow-origin header in response to the CORS request being authorized; and
   receiving, based at least in part on the determining that the response includes the access-control-allow-origin header, content from the second domain at the parent browsing context of the web browser.

5. The method of claim 1, further comprising:
   in response to the request for content from the first nested browsing context to the second domain through the proxy server, receiving at the first nested browsing context a response from the second domain through the proxy server;
   determining from the response that the first domain is a permitted origin domain on the second domain; and
   receiving, based at least in part on the determining that the first domain is a permitted origin domain, at the first nested browsing context the content from the second domain.

6. The method of claim 5, further comprising:
   determining from the response that the first domain is not a permitted origin domain on the second domain; and
   denying, based at least in part on the determining that the second domain is not a permitted origin domain, the first nested browsing context from accessing resources on the second domain.

7. The method of claim 1, further comprising:
   embedding a plurality of nested browsing contexts in a parent browsing context of the web browser, the parent browsing context being associated with a first domain and each of the plurality of nested browsing contexts being associated with a domain different from the first domain;
   sending a request for content from a first one of the plurality of nested browsing contexts to a third domain through the proxy server; and
   receiving at the first one of the plurality of nested browsing contexts the content from the third domain.

8. A system for delivering content of a webpage to a web browser on a device communicating with a network through a proxy server, comprising:
a processor configured to:
provide on the web browser a parent browsing context associated with a first domain, the web browser communicating with the network through the proxy server;
send a request for content from the parent browsing context to a second domain through the proxy server to request content from the second domain;
in response to the parent browsing context failing to receive the content from the CORS request, embed a first nested browsing context in the parent browsing context of the web browser, the first nested browsing context being associated with the second domain;
send a same-origin request for content from the first nested browsing context to the second domain through the proxy server, wherein the content requested from the same-origin request is the same as the content requested from the CORS request; and
receive at the first nested browsing context the content from the second domain; and
a memory coupled to the processor and configured to provide the processor with instructions.

9. The system of claim 8, wherein the memory is further configured to provide the processor with instructions which when executed cause the processor to:
receive at the parent browsing context a response from the second domain through the proxy server;
determine that the response does not include an access-control-allow-origin header in response to the CORS request; and
embed, based at least in part on the determining, the first nested browsing context in the parent browsing context of the web browser and send the same-origin request for content from the first nested browsing context to the second domain through the proxy server.

10. The system of claim 9, wherein the memory is further configured to provide the processor with instructions which when executed cause the processor to:
determine that the response includes an access-control-allow-origin header in response to the CORS request being authorized; and
receive, based at least in part on the determining that the response includes the access-control-allow-origin header, content from the second domain at the parent browsing context of the web browser.

11. The system of claim 8, wherein the memory is further configured to provide the processor with instructions which when executed cause the processor to:
in response to the request for content from the first nested browsing context to the second domain through the proxy server, receive at the first nested browsing context a response from the second domain through the proxy server;
determine from the response that the first domain is a permitted origin domain on the second domain; and
receive, based at least in part on the determining that the first domain is a permitted origin domain, at the first nested browsing context the content from the second domain.

12. The system of claim 11, wherein the memory is further configured to provide the processor with instructions which when executed cause the processor to:
determine from the response that the first domain is not a permitted origin domain on the second domain; and
deny, based at least in part on the determining that the second domain is not a permitted origin domain, the first nested browsing context from accessing resources on the second domain.

13. A computer program product for delivering content of a webpage to a web browser on a device communicating with a network through a proxy server, the computer program product being embodied in a non-transitory computer readable storage medium and comprising computer instructions for:
providing on the web browser a parent browsing context associated with a first domain, the web browser communicating with the network through the proxy server;
sending a request for content from the parent browsing context to a second domain through the proxy server to request content from the second domain;
in response to the parent browsing context failing to receive the content from the CORS request, embedding a first nested browsing context in the parent browsing context of the web browser, the first nested browsing context being associated with the second domain;
sending a same-origin request for content from the first nested browsing context to the second domain through the proxy server, wherein the content requested from the same-origin request is the same as the content requested from the CORS request; and
receiving at the first nested browsing context the content from the second domain.

14. The computer program product recited in claim 13, further comprising computer instructions for:
in response to the request for content from the first nested browsing context to the second domain through the proxy server, receiving at the first nested browsing context a response from the second domain through the proxy server;
determining from the response that the first domain is a permitted origin domain on the second domain; and
receiving, based at least in part on the determining that the first domain is a permitted origin domain, at the first nested browsing context the content from the second domain.

* * * * *